Aug. 22, 1933.　　　J. P. BEM　　　1,923,475
FRUIT PITTER
Filed July 21, 1930　　11 Sheets-Sheet 1

INVENTOR.
JOSEPH P. BEM
ATTORNEYS.

Aug. 22, 1933.   J. P. BEM   1,923,475
FRUIT PITTER
Filed July 21, 1930   11 Sheets-Sheet 4

INVENTOR.
JOSEPH P. BEM
BY Miller Boyken & Bried
ATTORNEYS.

Aug. 22, 1933.  J. P. BEM  1,923,475
FRUIT PITTER
Filed July 21, 1930  11 Sheets-Sheet 5

INVENTOR.
JOSEPH P. BEM
BY
ATTORNEYS.

Aug. 22, 1933.  J. P. BEM  1,923,475
FRUIT PITTER
Filed July 21, 1930  11 Sheets-Sheet 8

Aug. 22, 1933. J. P. BEM 1,923,475
FRUIT PITTER
Filed July 21, 1930 11 Sheets-Sheet 9

INVENTOR.
JOSEPH P. BEM
BY
ATTORNEYS.

Aug. 22, 1933.  J. P. BEM  1,923,475
FRUIT PITTER
Filed July 21, 1930   11 Sheets-Sheet 10

INVENTOR.
JOSEPH P. BEM
BY Miller Boykin & Bried
ATTORNEYS.

Patented Aug. 22, 1933

1,923,475

UNITED STATES PATENT OFFICE 1,923,475

FRUIT PITTER

Joseph P. Bem, Oakland, Calif., assignor to Pacific Pitting Machine Company Inc., Fresno, Calif., a Corporation of California Application July 21, 1930. Serial No. 469,380

34 Claims. (Cl. 146—28)

This invention relates to machines for automatically bisecting and pitting or coring fruit, particularly clingstone peaches, and is of the general type shown in my copending applications for patents on Pitting machine filed under Serial No. 337,343 on February 4, 1929, and Fruit pitting machine filed under Serial No. 404,900 on November 5, 1929.

The objects of the present invention are to provide general improvements in this type of machine, together with a simplification of the construction and to secure a still better control of the operations of the machine by the operative.

The Drawings

In the drawings accompanying this application:—

Fig. 1 is a perspective view of the machine as seen from the front looking downward, and with all protective casings omitted.

Fig. 21 is an enlarged side view of the main drive control clutch which automatically disengages at each complete cycle of the machine.

Fig. 30 is a detached detail of the knife oscillating drive members.

Brief description

This machine, like that of my copending application filed under Serial No. 404,900 is of the vertically revolving turret type, and in which type a peach first positioned by hand between bloom and stem end centering devices, is then impaled on a pair of spaced guide plates carried on a reciprocable carrier, and carried to and transferred to similar spaced guide or receiving plates on the confronting faces of a pair of intermittently revolvable turrets and there bisected by a high speed saw, then the halves each clamped in place on a turret face are revolved with the turrets each to a vibrating arched blade which cuts out the half pits while a second peach is being positioned against the following faces of the turrets for repetition of the operations.

The turrets of the present machine, knife mounting, drive and general construction, are quite different than shown in my copending patent and represent improvements brought out after a season's run with the last machine and a careful study of the machine for quantity production, but since the functioning of the machine as outlined above has been exhaustively described in my prior application the present description will be confined insofar as possible to the features and combinations on which patent protection is sought.

Detailed description

With reference to the drawings the machine comprises a bed plate 1, side walls 2 and a plurality of connecting frame members 3 which support all of the other elements of the machine and various guard or casing plates 4 (Fig. 31) to protect both the mechanism as well as an operative feeding fruit to the machine.

Driving system

The main drive of the machine comprises an electric motor 5 mounted on the forward end of the bed plate and driving by a chain 6 a sprocket 7 secured on a bushing 8 loose on a shaft 9 which extends transversely of the machine. Also secured to bushing 8 is another sprocket 10 over which a chain 11 extends passing forwardly around a small sprocket 12 for driving the blade oscillator and rearwardly around a sprocket 13 secured to a countershaft 14 carrying a loose pinion 15 meshing with a large gear 16 on a countershaft 17 carrying a small pinion 18 meshing with a large clutch gear 19 loose on the main cam shaft 20 extending across the machine and carrying a plurality of variously shaped cams for timing and giving the required sequential motion to the various machine elements.

Figure 3:
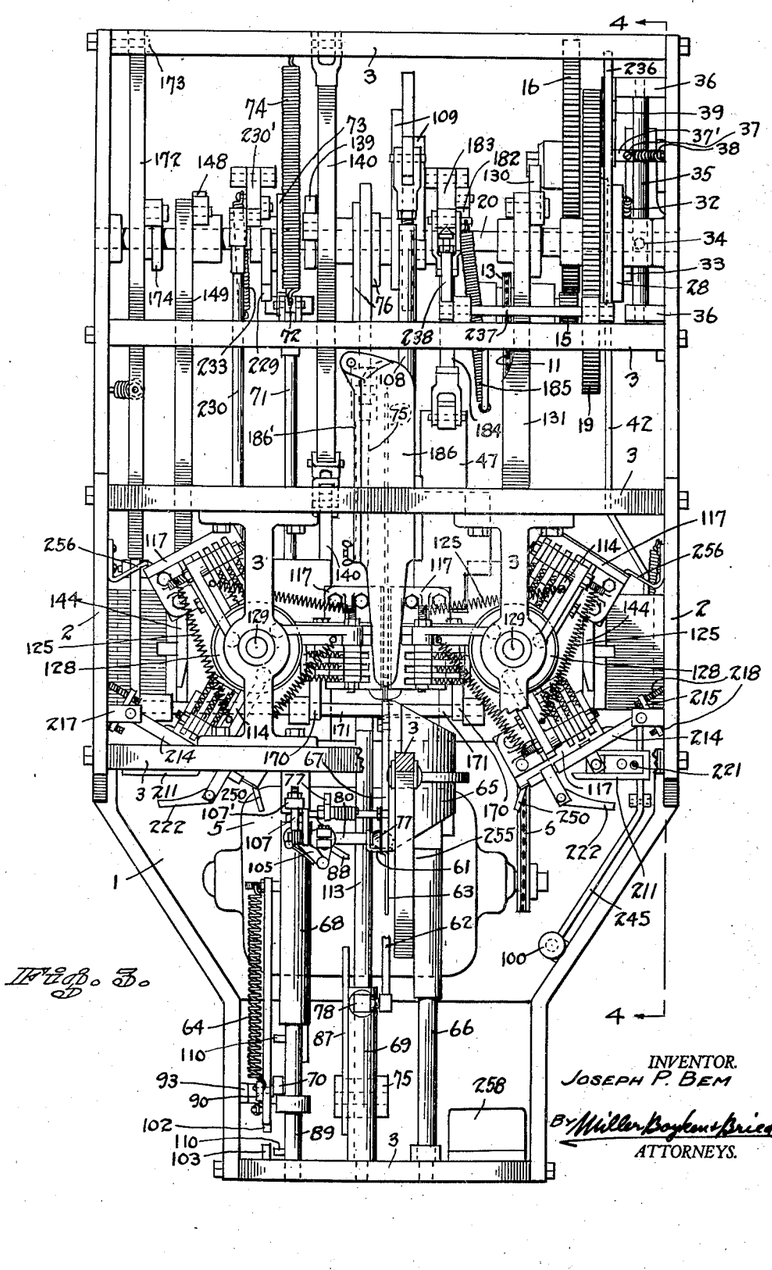
Fig. 3 is a somewhat enlarged plan view of the machine.
Figures 3B, 4, 4A:
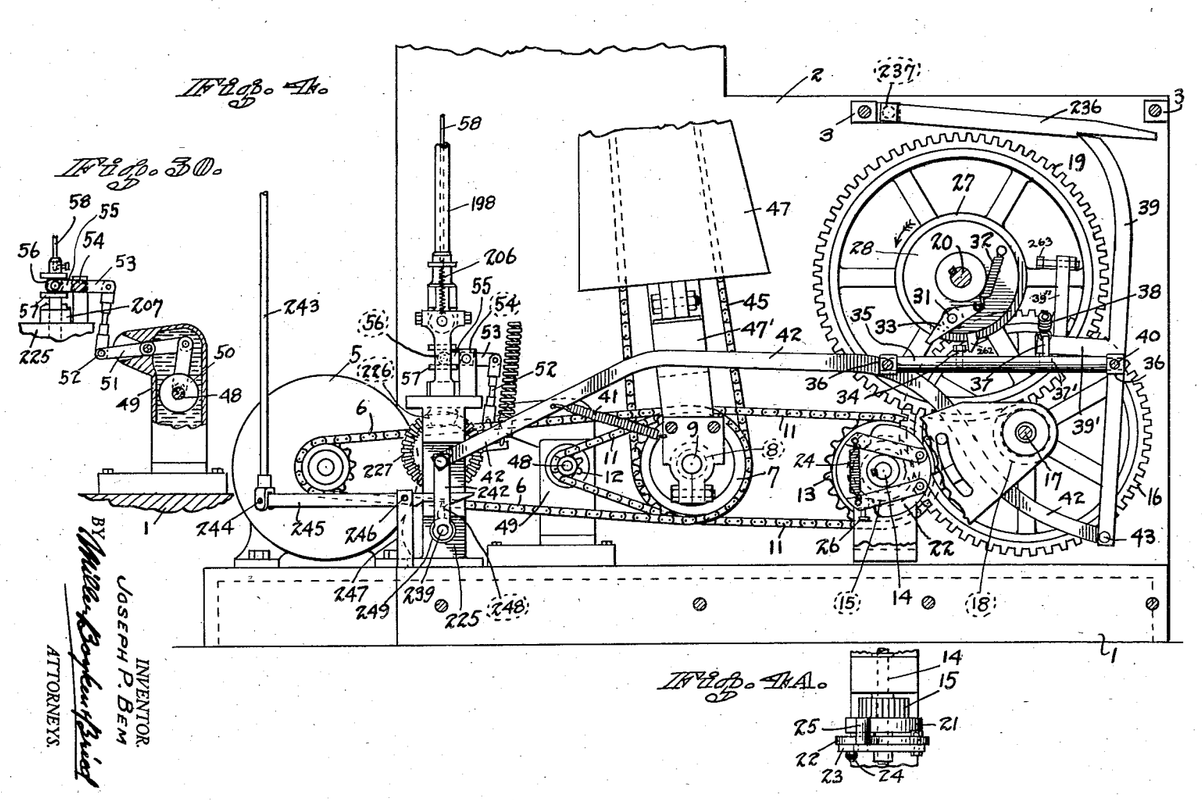
Fig. 4 is a side elevation of the lower part of the machine taken just inside the right-hand frame from the line 4—4 of Fig. 3 showing the main driving assembly, clutch trip, and with parts broken away to show the safety release device.
Fig. 4A is a plan detail of the safety release device of Fig. 4.

Countershaft 14 is provided with an overload slip device shown in Figs. 4 and 4A which comprises a notched disk 21 secured to the side of pinion 15 which is loose on the shaft, a shouldered disk 22 secured to the shaft, a pair of levers 23 pivoted at one end each to disk 22 with their free ends diverging and drawn toward one another by a tension spring 24, while a round pin 25 extending laterally from one of the levers lies in the notch of the disk 21 and against the shoulder of disk 22 so as to transmit rotative effort therebetween as the shaft is turned. A screw 26 projecting through a lug carried on the other lever and bearing against the disk 22 serves for adjusting the tension of the spring so that the side of the pin 25 may be made to bear with any desired pressure into the notch in disk 21 which is rounded to fit the side of the pin. The device may be set to slip at any predetermined torque to protect the machine should anything become jammed.

Clutch gear 19 is provided with a relatively large disk-like hub 27 in confronting relation with a similar hub 28 of a clutch secured to shaft 20. Disk 27 is recessed on its side as at 29, Fig. 21, and formed with a series of half round sockets 30, while clutch disk 28 is provided with a short rotatable shaft 31 projecting laterally through the disk into the recess in disk 27 and cut away at its inner end as shown at 31' in Fig. 21 so that upon turning it will swing into any of the sockets over which it may happen to be, and it is automatically pulled into such engaging position by a spring 32 connected to a small crank arm 33 secured to the outer end of shaft 31, except at the end of each cycle or revolution of the cam shaft when the outer end of arm 33 rides over a striker and turns shaft 31 to disengage the clutch.

This striker consists of a screw 34 projecting from the side of a short rock shaft 35 supported in brackets 36 on a side wall 2 of the machine, and which rock-shaft is provided with a pin or lug 37 connected to a spring 38 for turning the shaft to keep the striker 34 in the path of the clutch arm 33, unless forced out of such path by a trip lever 39 which is pivoted at 40 to one of the brackets 36 and provided with an arm 39' bearing against a branch 37' of lug 37 of shaft 35, through superior force of a spring 41 pulling on a bent rod 42 pivotally connected at 43 to lever 39 and controlled in a manner to be later described.

After engaging clutch 28 lever 39 is thrown back to latched position shown in Fig. 4 by means of a lug 262 on the clutch striking a screw 263 carried on an upwardly extending portion 39" of arm 39', so that clutch releasing striker 34 will again be in the path of clutch arm 33 as it comes around at the finish of the cycle.

Bushing 8 on shaft 9 also carries another sprocket 44 driving a chain 45 which extends upwardly for driving the circular saw carried at the upper end of a rockable post 47 supported at its lower end by being clamped to shaft 9.

To complete the description of the drive reference is again made to sprocket 12, as this is secured to the outer end of a small shaft 48 projecting into an oil-filled housing 49 containing a small crank assembly 50 (see Fig. 30) operating a high-speed rocker arm 51 linked at its outer end at 52 to an arm 53 of a horizontally extending rocker bar 54 provided with forwardly extending ends 55 fitted with trunnion rollers 56 engaging between round flanges of a vertically reciprocable spool 57 secured at the lower ends of the wires 58 of Bowden cables 59 which oscillate the pitting blades 60 in the same general manner as described in my prior applications mentioned. The flanged spool gives the wire freedom to revolve with the swinging of the pitting knives.

The various branches of the drive having been traced out, the description will now take up the passage of a peach through the machine and describe special features and functioning of the parts involved.

Fruit receiving and transferring devices

A peach, or other fruit, is placed by hand between the bloom and stem end devices 61, 62 respectively and with its suture aligned with optical aligning blade or finger 63 projecting forwardly just above the fruit while being inserted. The peach is pushed against the bloom end device which is thereupon released and under action of spring 64 follows the peach and clamps same against the stem end device after which a horizontally slidable carrier 65 mounted on a guide rod 66 and carrying a pair of horizontally disposed vertically spaced and aligned impaling guide plates 67 advances by cam action and impales the peach from above and below the bloom and stem end devices, after which the carrier and both devices are moved in reverse direction to carry the peach into the turret plates for bisecting by the saw.

In construction the bloom end and stem end peach-receiving devices are about the same as those described in my former cases mentioned. They are mounted on horizontally reciprocable carriages 68, 69, the former operated through means of vertical lever 70, rod 71, lever 72 and cam 73 on cam shaft 20, and returned by a spring 74, and the latter moved positively in both directions along guides 113 by a rod connection 75 and double cams 76.

Figures 28, 29:
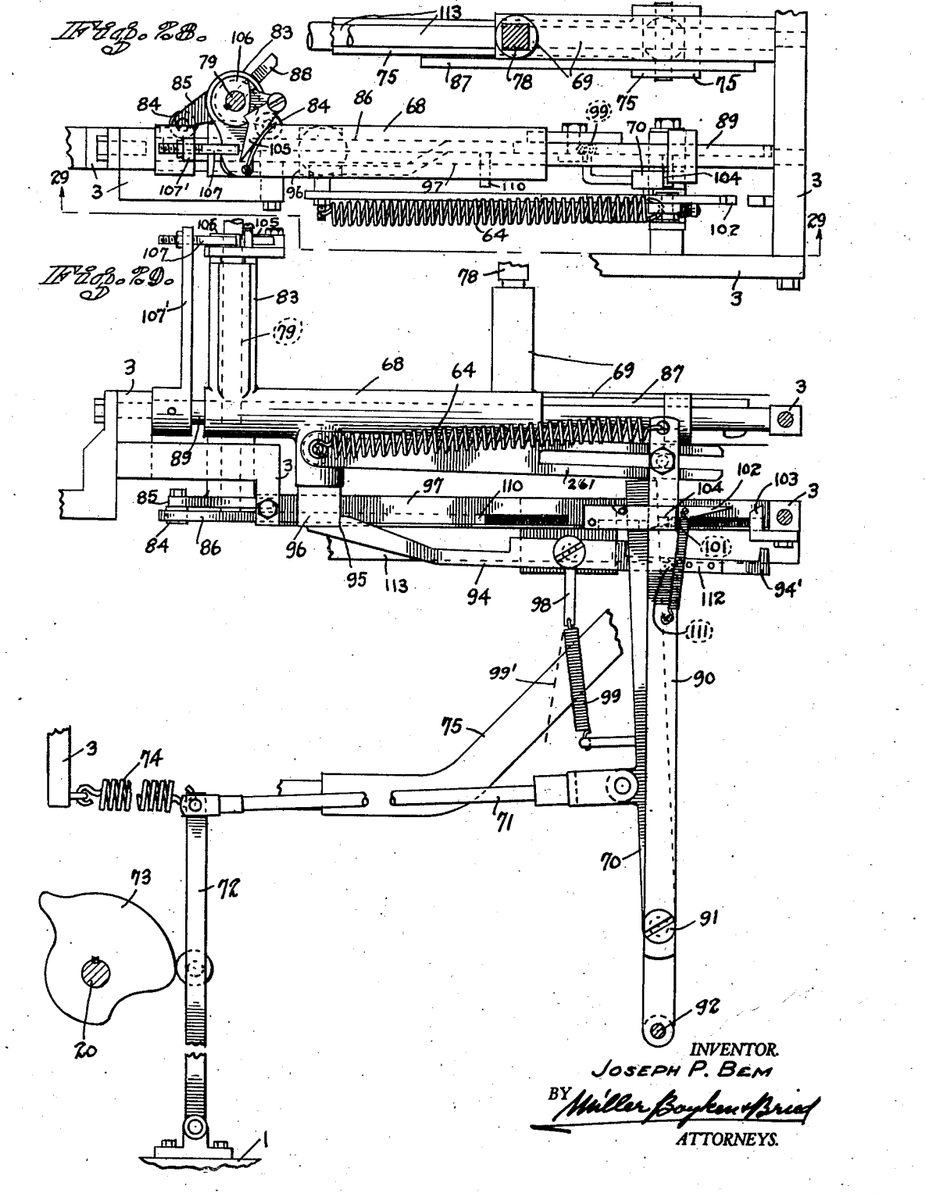
Fig. 28 is an enlarged plan view of a portion of the machine showing the carriage and mounting members of the bloom end device and its relation to the stem end device mounting.
Fig. 29 is a side elevation of Fig. 28 showing the cam actuated lever and appurtenances controlling the reciprocating movement of the carriage and the lateral swinging of the bloom end device taken on the line 29—29 of Fig. 28.

Bloom end device 61 is at the end of a horizontal arm 80 and has a ring seat to receive the extreme point of the peach, and carries a revolvable tip cutter 77 operated upon forward sliding of carrier 65 through means of a projection striking an arm 77' as in the former machines, though the actuating devices for controlling the movements of the bloom end device and tip cutter are somewhat different as will be seen in Figs. 28 and 29. In these figures the post of the stem end device is shown cut off at 78 and so also is the vertical spindle 79 of the bloom end device and on which its laterally extending arm 80 swings to get out of the way of the saw, carrying with it the tip cutter 81 which is mounted at the end of a small shaft 82 passing through arm 80.

The vertical spindle 79 of the bloom end device is revolvable in a boss 83 of carriage 68 and prevented from revolving by means of a pair of small rollers 84 carried on a bracket 85 secured to spindle 79 and rolling against the side of a shiftable bar 86 which is withdrawn from the rollers at the proper time so that the bloom end device can swing. The forward movement of a peach carried into the machine will carry the bloom end device along with it, or if no peach is in position a striker rod 87 secured to the side of carriage 69 will impinge a small arm 88 projecting from the revolvable bloom end device and carry it along until rod 86 is withdrawn and after which the bloom end device will be swung out of the way of the peach and stem end device in their further travel as the peach is carried to the turrets on the aligned carrier plates and pushed off onto the turret plates for still further movement of the stem end device.

During such further advance of the stem end device and carriage 69 rod 87 will slide along the beveled-off end of arm 88 to effectually lock the bloom end device and tip cutter out of the path of the stem end device until it has retracted sufficiently on the return movement to withdraw rod 87 to the right of arm 88 as viewed in Fig. 28.

The bloom end device is resiliently drawn toward the stem end device by means of a tension spring 64 connected to freely slidable carriage 68 and to the upper end of a lever 90 pivoted at its lower end at 91 to lever 70 which is in turn pivoted at its lower end at 92 to a rod 93 rigidly projecting downward from the frame of the machine.

In the operation of the machine, rod 70 is alternately moved back and forth by cam rod 71 in a peculiar manner to alternately stretch and release spring 64, also to trip various latches and operate bloom device locking bar 86.

In detail, when bloom end device is under tension of spring 64 in peach receiving position as shown in Figs. 28 and 29 a pivoted latch bar 94 engages at 95 the corner of a guide lug 96 of the carriage 68 which slides along a guide bar 97 and thus prevents the bloom end device from closing in on a peach placed in position. However, this latch 94 has a small arm 98 projecting from it and is gently pulled in a direction to release its engagement with lug 96 by means of a very light spring 99, so that immediately upon pressing the bloom end of the peach forcibly against the bloom end device the pressure at point 95 will be released and latch 94 will fall to permit free return of bloom end carriage under pull of spring 64 so that the bloom end device will clamp the peach against the stem end device.

The cams on cam shaft 20 controlling carriages 68 and 69 are so shaped that after clamping of the fruit between the bloom and stem end aligning devices as explained, and pressing the clutch tripping button 100 the first movement of lever 70 is toward the right (Fig. 29) carrying lever 90 with it, through means of a small lug 101 on lever 70 engaging a notch in the underside of a spring latch 102 carried by lever 90, until the latch is released by striking an abutment 103 at the end of the frame 3. This releases lever 90 so that it moves to the left within limits of a slot in a link 261 on carriage 68 and releases all tension on spring 64 so that carriage 68 is free and at the same time lever 70 has, by engaging a lug 104 projecting from the side of the shiftable bar 86, drawn the left-hand end of same away from engagement with rollers 84 so as to remove this particular lock from lateral swinging of the bloom end device. However, since carriage 68 must be carried to the left with each peach until it is reset in front of lever 94 I provide means to hold the bloom end device in rigid lateral projection from its carriage 68 until it has been carried by the peach (or rod 87 of carriage 69) the required distance to the left. This means comprises a small spring latch 105 on carriage 68 engaging a notch in a small flange 106 secured to the spindle 79 which revolves with the swinging of the bloom end device, and which latch is released at the left-hand end of the carriage movement by striking a releasing pin 107 carried on a fixed bracket 107' secured to the upper guide rod 89 on which carriage 68 slides, so that immediately upon releasing of this latch the bloom end device and tip cutter swing out of the path of the peach.

Stem end carriage 69 and carrier 65 then move by cam action the required distance to transfer the impaled peach to the turrets after which carrier 65 which is controlled by rod 108 and double cams 109, remains at the inner end of its stroke and stem end device carriage 69 returns to the outer end of its stroke as in the drawings. As soon as stem end device has returned past the bloom end device lever 70 is moved to the left by cam action and by engaging a second lug 110 projecting from the side of bar 86 slides the latter to the left to thereby impinge bracket 85 and swing the bloom end device back into position then by a further movement of bar 86 back of rollers 84 to lock it in receiving position for the next peach.

During the leftward movement of lever 70 small spring 99 is thrown over center to the dotted line 99' to resiliently force latch 94 upward to engage lug 96 and hold the bloom end device in out position, after which levers 70 and 90 move to right to the position shown in Fig. 29 and remain there holding spring 64 under tension and also swinging spring 99 to position shown so as to put a slight downward pull on lever 94 so that it will release with trigger-like action when the next peach is shoved against the bloom end device and with a repetition of the actions above described.

In case no peach were inserted and the clutch tripped to start the cam shaft spring 64 will nevertheless be automatically released upon the initial movement to the right of lever 90 as it is provided with a small pin 111 at its inner side which rides under the beveled end of a small lug 112 secured to the side of an extension 94' of latch 94.

Revolving turrets

The intermittently revolvable turrets to which the fruit is transferred from the guides 78 of carrier 65 are now made with three sides instead of four as in the machine of my copending application Serial No. 404,900 as this has been found a considerable improvement in simplifying the mechanism, getting a better action and providing for better visibility of the pitting knife operations by the operative of the machine.

These turrets including so many parts have no general designating numerals, but the main body of each is a three-winged spider 114 mounted on the upper end of a vertically disposed hollow shaft 115, and pivoted at 116 to the three wings of which spider are three hanging brackets 117 held in position by disks or plates 114', while secured to the lower outer portion of each bracket is a pair of horizontally disposed vertically spaced guide plates or strips 118 of thin sheet metal which form the outer faces or sides of the turrets. These guide strips of the three faces of the two turrets are adapted upon revolution of the turrets to be brought to confronting relation as shown in Fig. 5 wherein the plates of the two turrets are respectively numbered 118 and 118' and they are also spaced from one another by small spacers 119 at the forward ends of the plates so that as the turrets come tightly together on these spacers there will be a narrow space between the guide plates 118, 118' for the saw to bisect the fruit.

Figure 5:
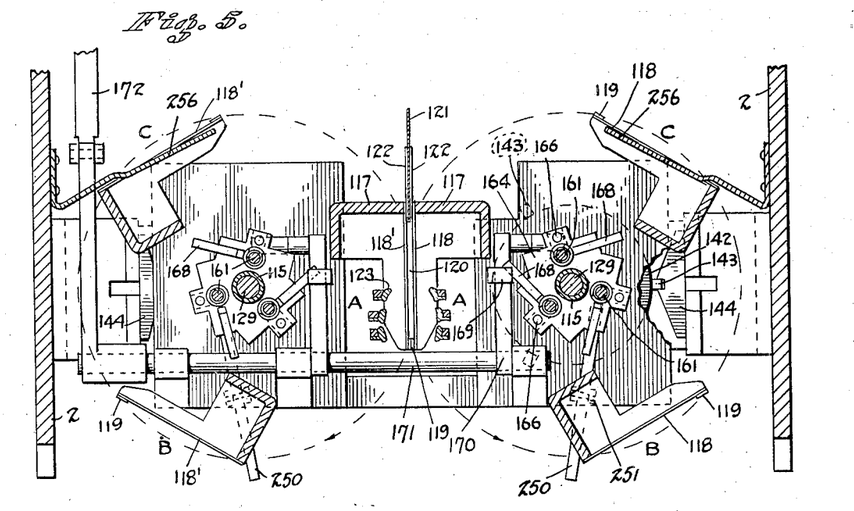
Fig. 5 is an enlarged horizontal cross section of the three-sided revolving turrets as taken along the line 5—5 of Fig. 7 or center line of the peach operated upon, and shows the relation of the turrets to the saw.

The space for the saw is designated 120 in Fig. 5 and the entering saw is indicated at 121 with its side guard plates 122 also as entering the space. The thickness of the plates 118, 118' and width of the space 120 are shown much exaggerated in Fig. 5 as the space is narrow and the plates very thin so that the distance over all outside the plates is only equal to the thickness of the heavy guide plates 67 of carrier 65 so that the impaled peach is easily slid from the carrier to the turret plates when aligned and abutted upon inward movement of carrier 65.

After the peach is slid onto the turret plates, the peach is clamped thereagainst from opposite sides by a plurality of fingers 123, the saw advances through the fruit sawing same in half, the saw recedes and the turrets revolve a third turn, each with a half peach clamped against the inner sides of the plates so as to carry the halves from bisecting position A to pitting position B, and after which the next third turn of the turrets carries the pitted halves to position C where the clamping fingers 123 are released and the finished product is dropped into discharge chutes 124.

Turret details

Figure 7:
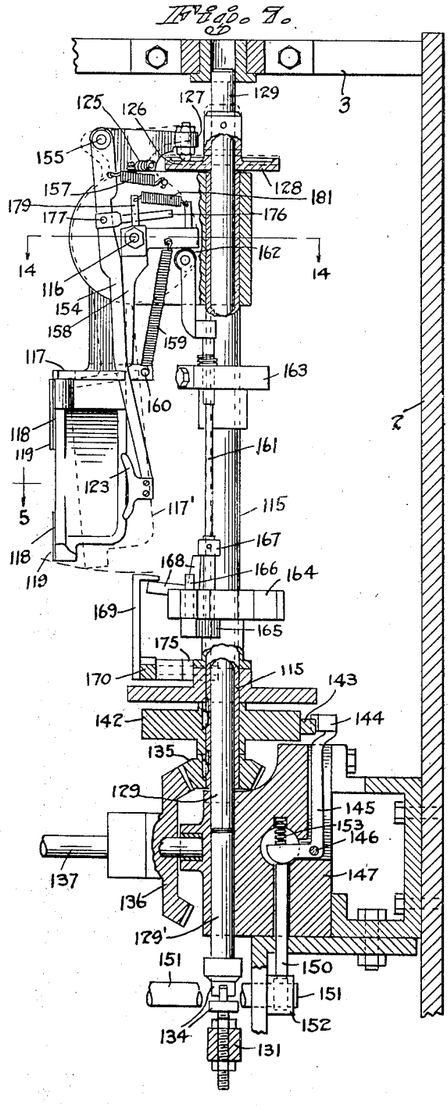
Fig. 7 is an elevation of the turret of Fig. 6 generally taken along the line 7—7 thereof, but with parts broken away to reveal the turret mounting, and also includes in section part of the turret rotating mechanism and locking device.
Figure 8:
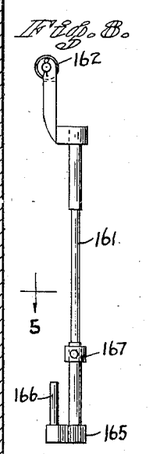
Figs. 8, 9, 10, 11, 12 and 13 are detached details of parts shown in Fig. 7.
Figure 9:
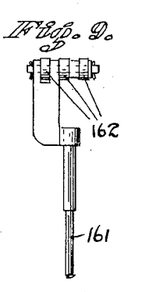
Figure 10:
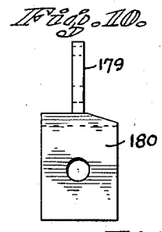
Figure 11:
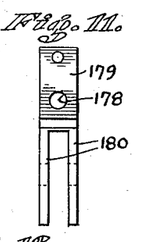
Figures 12, 13:
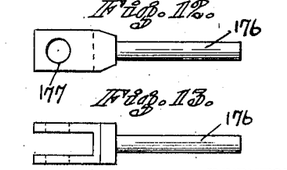

In order for the turrets to turn they must first be collapsed so that the sides will clear at the sawing position, and to this end brackets 117 are swung inwardly on pivots 116 to the dotted position 117' shown in Fig. 7 just before each fractional turning movement. To this end a large tension spring 125 is hooked from the upper end of the swinging bracket 117 to a part of the spider 114 to pull it inwardly so that the lower end of the bracket carrying the plates 118 will be swung outwardly, the motion being limited by an adjustable stop screw 126 extending downwardly through an arm 127 formed on the upper end of the bracket and bearing against the upper surface of a disk 128 carried on the upper end of a vertical shaft 129 freely supported within hollow shaft 115.

The lower ends of screws 126 are rounded and disk 128 is provided with an upper flange so that a small quantity of oil may be kept upon it, and when the disk is raised by lifting shaft 129 it will throw the lower ends of the brackets 117 inwardly so that they will clear the various mechanisms at each fractional turn. Shafts 129 are both raised and lowered at the proper timed intervals by a cam 130 on cam shaft 20 operating on the rear end of arm 131 which extends under one of the vertical shafts 129 and is secured at its forward end to a transverse shaft 132 provided with a short rearwardly extending arm 133 passing under the other shaft 129 so that upon raising and lowering of the arm 131 the shafts will also be raised and lowered. Shafts 129 do not rest directly upon arms 131 and 133 but the shafts are supplemented with lower separate sections 129' provided with a yoke and vertical adjusting screw arrangement 134 so as to compensate for slight angular displacement and provide for separate vertical adjustment.

To revolve the turrets at the required intervals their hollow shafts 115 are fitted at the lower ends with bevel gears 135 engaging larger bevel gears 136 carried on a transverse shaft 137 and on which shaft is also secured a notched or ratchet disk 138 intermittently rotated at the proper intervals by a cam 139 on the cam shaft through means of a rod 140 and a ratchet pawl mechanism 141 mounted on the hub of ratchet disk 138.

The turrets are also each positively locked at each of their three positions by provision of a disk 142 on each hollow shaft carrying three wedge lugs 143 successively engaged by a movable socket 144 which closes upon each lug as it comes around to place. These movable sockets are each carried at the upper end of a crank arm 145 pivoted at 146 in a slot in a fixed bearing block 147 and rocked at the proper intervals to lock or release by a cam 148 on cam shaft 20 through means of an arm 149 passing under a vertically movable pin 150 operating against the short end of crank 145, while arm 149 extends further forward and is secured to one end of a transverse shaft 151 provided at its other end with a short return arm 152 operating on the other pin 150 of the other turret. An upward movement of the pins releases the turrets for revolving, while a downward movement permits springs 153 to come into action and force the wedge sockets 144 tightly over the wedge lugs 143 so that the turrets are held immovable.

Clamping fingers

Figure 14:
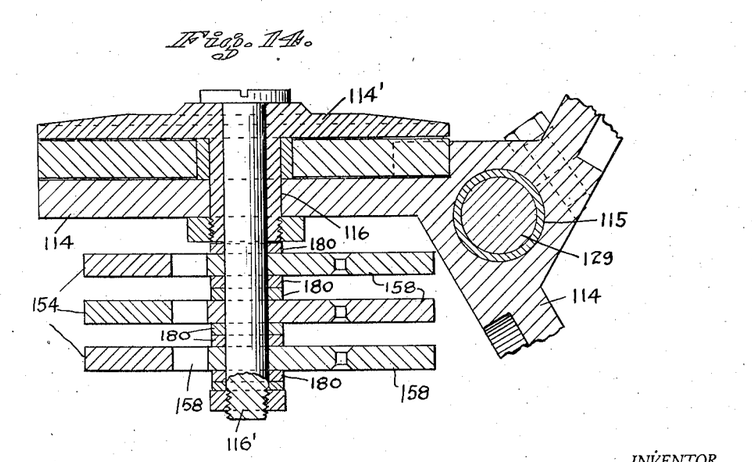
Fig. 14 is an enlarged horizontal section of the turret bracket mounting and upper part of the fruit clamping levers or fingers as taken along the line 14—14 of Fig. 7.
Figures 15, 16, 17, 18, 20:
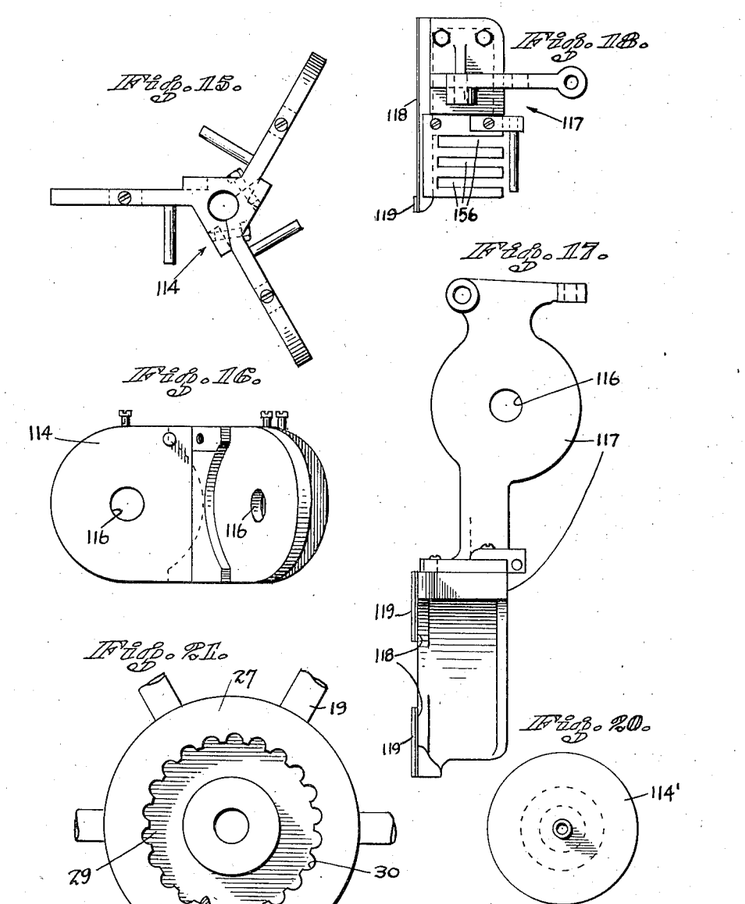
Fig. 15 is a detached plan view of the three-winged spider or hub of one of the turrets.
Fig. 16 is an elevation of the part shown in Fig. 15.
Fig. 17 is a side elevation of one of the pivoted brackets each of which carries a pair of fruit guide plates at its lower end.
Fig. 18 is a plan view of the part shown in Fig. 17.
Figs. 19 and 20 are respectively plan and side views of one of the pivot disks or plates which support the pivoted turret brackets.
Figure 19:
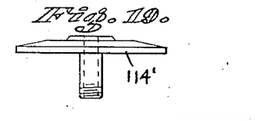

The action of the clamping fingers 123 will now be explained. There are three of these fingers for each turret side and they are set relatively forward and so arranged that at least two will come down upon a small peach, and all three if the peach is large. The fingers are preferably of non-corrodible metal or other non-corrodible material and curved as shown in Fig. 7 so as to position around the curved body of the fruit and they are arranged for independent clamping action so that each can seat tightly against the fruit and be locked thereagainst regardless of the shape of the fruit or its size, within the capacity of the machine and to a minimum provided by the mounting of the fingers. To this end each finger is mounted at the lower end of a relatively long lever 154 hanging from a pivot 155 carried by the upper end of turret bracket 117, guided for movement in a slot 156 normally pulled away from the fruit by light springs 157 but forced toward the fruit at the proper time by separate crank levers 158 pivotally mounted on a pin 116' projecting through bracket pivot 116 (see Fig. 14).

These crank levers 158 are each normally urged outward by a relatively strong spring 159 hooked to a pin 160 extending from the bracket 117 but are pulled back to allow fingers 123 to spring away from the fruit by an intermittently operated vertical lift rod 161 carrying three rollers 162 at its upper end bearing under the short ends of the crank levers, as clearly shown in Fig. 7. Rods 161 are grouped around hollow shaft 115 guided in holes in collars 163, 164 and each rod is provided at its lower end with an outwardly extending lug 165 and a vertically projecting guide pin 166 to prevent rotation, and a collar 167 underneath which a latch 168 engages to hold the rod up, so that the clamping finger which it controls will be released.

Latch 168 is actuated by a concealed spring to engage under collar 167 and is intermittently released to permit one rod to drop for clamping the fruit on the turret plates by a hook-like device 169 carried at the end of a short lever 170 extending from a transverse shaft 171 rocked by a long rod 172 pivoted at its end at 173 to the side wall 2 of the machine and given the required intermittent motion by a cam 174 on cam shaft 20. Besides the hooks 169, short levers 170 also carry a laterally extending lug or roller 175 which upon rising of lever 170 engages under lug 165 of the rod 161 of the turret face in fruit releasing position C so as to lift the rod for snapping in of latch 168 to hold the fruit clamping fingers completely released.

Special means are provided to definitely lock each finger against the fruit regardless of what position it may be in, and to this end each lever 154 carries a small laterally extending round rod 176 pivoted to it at 177 and extending through a sharp-edged hole 178 in a locking plate 179 pivoted on pin 116' by means of yoke ends 180 straddling the crank levers 158 and resiliently pulled by a small spring 181 to "bite" against rod 176 at whatever position it advances to when crank lever 158 advances lever 154 to force its finger 123 against the fruit. Thus upon downward movement of rod 161 all three fingers move outward, seat themselves independently against the fruit, and each is automatically locked against reverse movement, yet still resiliently urged toward the fruit by spring 159. Locking devices 179 are released by change of angle when rod 161 is raised.

In Fig. 7 one turret side, its set of fingers and lift rod etc. are shown, but it is understood that three sets of this mechanism are symmetrically grouped about each of the vertical shafts 115.

Bisecting saw

The post 47 which carries at its upper end the circular saw 121, is a hollow column with yoke-like legs 47' clamped to shaft 9 and it is rocked back and forth to move the saw forward and backward in the space between the confronting turret sides, backward by a cam 182 on the cam shaft operating against pivoted arm 183 linked at its upper end at 184 to the column, but it is moved forward for cutting the fruit only by the tension of a relatively light spring 185 so that the saw will be carried through the fruit and its pit by the maximum pull of this spring and can stop if any undue obstruction is met.

Figures 6, 6A, 6B:
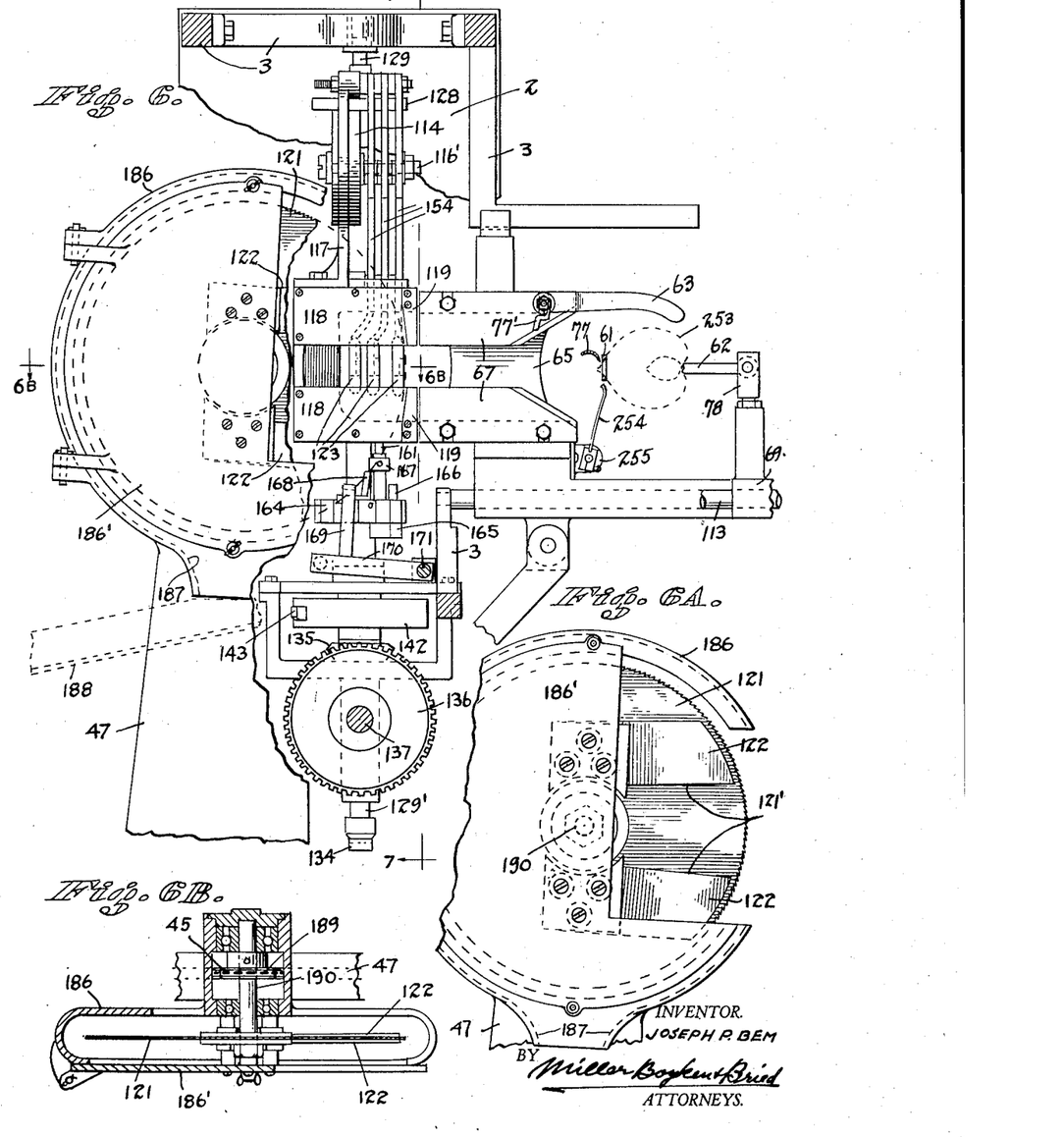
Fig. 6 is an enlarged side view of one turret with its peach-receiving guides aligned with the carrier guides preparatory to the carrier starting forward to impale a peach held in the bloom and stem end devices, also showing the relation of the swing circular saw for bisecting the peach.
Fig. 6A is a broken detached view of the upper end of the swing saw carrier showing the saw and its spacer plates.
Fig. 6B is a horizontal section of the swing saw carrier taken along the line 6B of Fig. 6.

The saw blade is covered by a circular hood 186 which is open in front sufficiently to clear the turrets, and the hood carries the thin flat spacer plates 122 bearing lightly at opposite sides of the saw above and below the region 121' which passes through the fruit. One side 186' of the hood is removable for replacing of the blade, the bottom is formed with an opening 187 discharging into a drain chute 188 required for drainage of a small stream of water sprayed into the hood and onto the saw from a tube 259 for washing away any accumulation of fruit juices and pit dust. Fig. 6B shows the internal arrangement of the hood and saw mounting and drive chain 45 passing over sprocket 189 on saw mandrel 190.

Pitting knives

Figure 22:
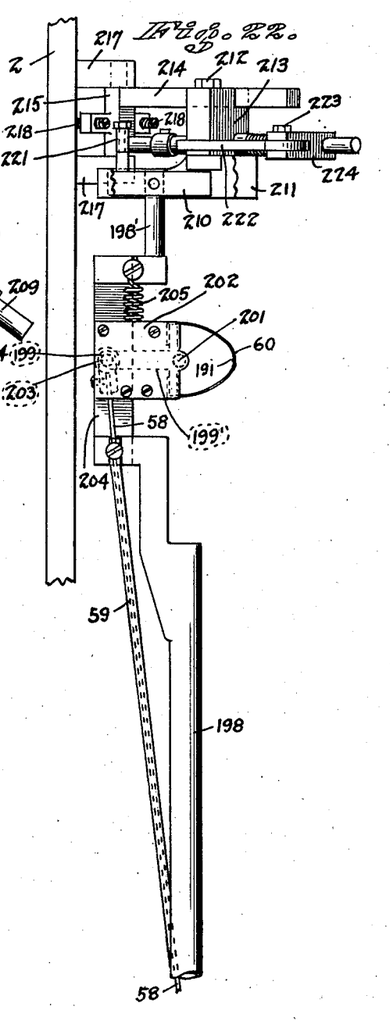
Fig. 22 is an enlarged front elevation of one of the oscillating knife assembly, and upper portion of the knife shaft.
Figure 23:
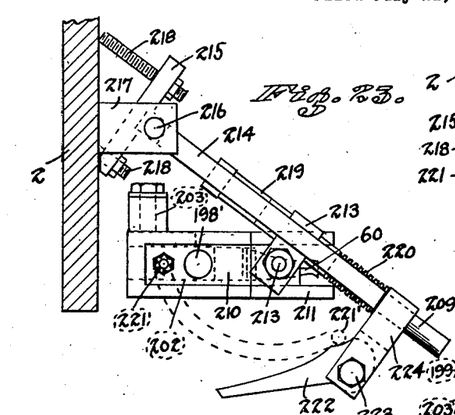
Fig. 23 is a further enlarged plan view of the upper end of the knife mounting shown in Fig. 22.
Figure 24:
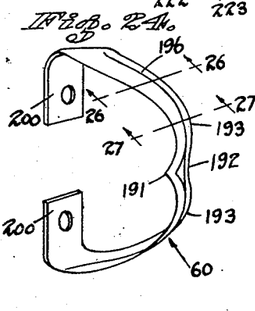
Fig. 24 is a still further enlarged perspective view of the knife blade.
Figure 25:
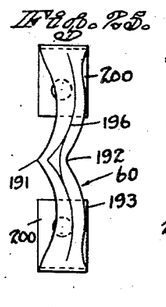
Fig. 25 is an enlarged front or end view of the blade.

The pitting knives, as in the machines of my prior applications mentioned, are provided with arched blades which vibrate at high speed as they are drawn through the fruit halves each by a separate spring, but the form of the blades and their mounting have been improved somewhat as shown particularly in Figs. 22 to 27. In Figs. 22 and 24 the blade 60 will be seen to be of a somewhat pointed arch form and in the end view Fig. 25 (Figs. 24 and 25 being considerably enlarged) it will be noted that the arch does not lie in a simple flat plane, but that the two sides of the forward face of the arch (in direction of cutting action) curve toward a beak-like point 191 which leads into the fruit while the rear edge of the blade is curved inwardly in back of the point at 192 and backwardly at 193 into a somewhat ogee form. The angle of sharpening this blade has also been found of great importance and takes the form shown enlarged and somewhat exaggerated in Figs. 26 and 27 which are cross sections of the blade as designated on Fig. 24.

Figure 26:
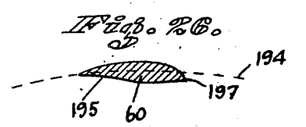
Figs. 26 and 27 are cross sections of the blade as taken from the lines 26 and 27 respectively of Fig. 24.
Figure 27:
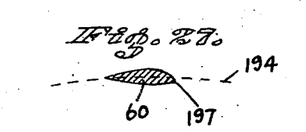

At the point and to about the line 27—27 the cutting edge of the blade is beveled both inside and outside about evenly as judged from the arc of swinging 194 of the blade, then gradually changing until about at the line 26—26 the bevel is substantially all on the inner edge as at 195, while the outer surface of the blade curves down from the line 196 at the rear edge to meet the inner edge of the blade at 197. By this form of blade I am able to cut close to a small pit even with a very large arch such as required to handle a large pit. The inward rear curve 192 permits the arch of the pit to come through in a peculiar manner, hard to describe, as the blade is rocked over the pit, as it should be understood that the blade resiliently hugs the pit and conforms to any position the pit may occupy as in my former disclosures mentioned.

The blades are carried on vertical shafts 198 positioned respectively at the stopping point B of each turret and these shafts are revolved about a half turn positively by cam action to starting position then at the proper time released and swung through the fruit halves each by an independent spring so that either or both blades may stop if it meets with an unusual obstruction, all substantially as in my earlier disclosures mentioned, and the blades are vibrated in an arcuate path as before by Bowden cables 59 the wires 58 of which are pivotally connected respectively at 199 to the ends of cross-shaped rocker arms 199' to the outer ends of which the inwardly turret ends 200 of the blade are secured. This rocker may be removed at any time with its blade without disturbing the adjustment by simply removing the outer plate of the carriage and pulling out the pin 199. The rocker itself is pivoted at 201 to the carriage 202 which in turn pivots at 203 to the offset 204 of the shaft. This carriage is resiliently stabilized in central position by a spiral spring 205 secured at one end to the shaft and at the other end to the carriage, so that it will work both ways in permitting the carriage to rise and fall over the pit.

To cause the knife to hug the pit I now provide a spiral spring 206 at the lower part of the vertical shaft 198 to constantly urge it outward, that is, to pull the arch toward the pit. This spring is attached at its upper end to the shaft and at its lower end to the side of the member 207 of the universal joint 208 through which the Bowden wire extends for reciprocation by the spool 57, thus the blade is able to rise bodily over any size pit in swinging about the same from movable axis of shaft 198.

The upper end of shaft 198 is also mounted in a manner permitting bodily movement along a guiding pin 209 in a plane substantially parallel with the face of the turret at pitting position B so that in case of pit having some unusual projection upon which the blade was hung up the operative could give a slight shove to the carriage in a forward direction to start the blade again on its cut at perhaps a slightly different angle to overcome the obstruction.

This mounting is best shown in Figs. 22 and 23 wherein the upper end of shaft 198 is designated 198' and it is fixedly secured in a block 210 for sliding substantially parallel to the plane of the arch blade in a bracket guide 211 itself vertically pivoted at 212 (at a point substantially aligned over the universal joint center at the lower end of shaft 198) to a block 213 slidable along pin 209 and an auxiliary guide rod 214 substantially in the plane of the turret side.

Pin 209 and guide 214 are secured to a block 215 vertically pivoted at 216 to lugs 217 projecting from the side wall 2 of the machine. Block 215 being provided with adjusting screws 218 so that the angle of extension of pin and guide may be adjusted for best effects and then locked in position. Sliding block 213 is resiliently held against a stop collar 219 in what may be termed normal position, (to hold the blade at proper point for entering the fruit just back of the stem end of the pit) by a spiral compression spring 220 surrounding rod 209 and permitting a limited sliding movement of this block parallel to the turret side in a forward direction only.

Core shape control

Figs. 23 and 24 (also Figs. 1 and 3) show the position of the parts after the blade has finished its cut, but at start of cut the knife shaft is revolved (by cam action) about a half turn until a small guide roller 221 contacts a cam arm 222, as indicated at 221', which controls the entering movement of the blade and which may be adjusted to any position by means of a screw 223 securing it to a block 224 at the end of rod 209.

In pitting peaches the shape of this cam arm only controls the entering of the knife blade so that it will clear the stem end of the pit properly and after which it is the body of the pit itself which further controls the blade, but if the machine is used for coring pears the cam arm 222 is given a form to control the cut the entire distance so as to cut out an elongated core 80 even though no solid pit body is present to guide the blade.

At the lower ends, the knife shafts are both connected to universal joints as mentioned and the lower ends of the joints have rotative bearing in brackets 225 and carry bevel pinions 226 respectively meshing bevel gears 227 loose on opposite ends of a transversely extending rock shaft 228 rocked one way by cam 229 on cam shaft 20 through rocker arm 230, 230' and suitable connections and returned by spring 233, the motion from shaft 228 being communicated to the gears for one way motion only (to return the knives to starting position) by jaw clutches 231 engaging jaws on the hubs 232 of the gears, for the cutting stroke of the knife gears 227 are independently revolved by means of springs 234 each pulling on an arm 235 projecting from the hub 232 of the gear, all substantially as shown in my former application Serial No. 404,900.

Interlocking controls

From the above it will be seen that the revolving saw is resiliently advanced through the fruit, and the knives are independently swung through the fruit halves to remove the pits, these operations taking place while the turrets are locked at rest upon making a third of a revolution and with the main clutch 27, 28 disengaged. Automatic locking means is provided to absolutely prevent re-engaging of the main drive clutch to revolve the turrets or cause any other parts to move until the sawing and pitting operations are all completed. This apparatus is in some respects about the same as shown in my prior case Serial No. 404,900, and comprises the spring-actuated lever 39 tending through its arm 39' bearing against lug 37' to throw clutch striker 34 into clutch engaging position, but normally prevented from so doing by a plurality of interlocking means, all of which must be in released position before lever 39 can move.

One of the interlocking means is a notched latching lever 236 secured at one end to one end of a short transversely extending shaft 237 provided at its other end with a small pointed arm 238 under which the upper end of the saw swinging arm 183 rides upon the end of the forward stroke of the saw to thereby rock the small shaft 237 and release notched lever 236 from the upper end of lever 39. Thus if the saw had finished its cut it would have released clutch tripping lever 39. However, the lever is still locked unless both pitting knives have finished their cuts. This is effected by a small transversely extending shaft 239, carrying at its outer end a crank 242 to which lever 42 is pivoted, provided with a notched sleeve 240 near each end and into the notches of which sleeve a jaw 241 carried at the lower end of each knife shaft 198 extends so as to block shaft 239 from turning at all unless the knife shafts have revolved sufficiently to have entirely completed their pitting operations and not until both shafts have completed their cutting movement is shaft 239 released by these jaws. This feature is the same as in my prior disclosure.

However, there is still another independent lock on shaft 239 which is only released by the operative pressing upon the tripping or starting button 100. This button is at convenient reach of the right hand of the operative but far enough so that this hand will be taken from vicinity of the moving parts which impale and transfer the fruit just before the machine starts, and the button is mounted at the upper end of a depressible rod 243 pivoted at its lower end at 244 to a gravity latch bar 245 pivoted in turn at 246 to a bracket 247 on the base of the machine, and which latch bar is formed with a jaw engaging a lug 248 carried by a collar 249 secured to shaft 239. This latch is set a little close, or that is, latching lever 236 is set a little loose, so that upon pressing on the button at any time before the sawing or pitting operations are finished, the latch 245 will rise to release jaw 248 but cannot fall back again as crank 242 would have advanced a trifle. Thus the machine is locked at the end of each cam cycle until four positive locks have been released and until the sawing and pitting operatings which follow the cam cycle have each and all been completed.

Figure 31:
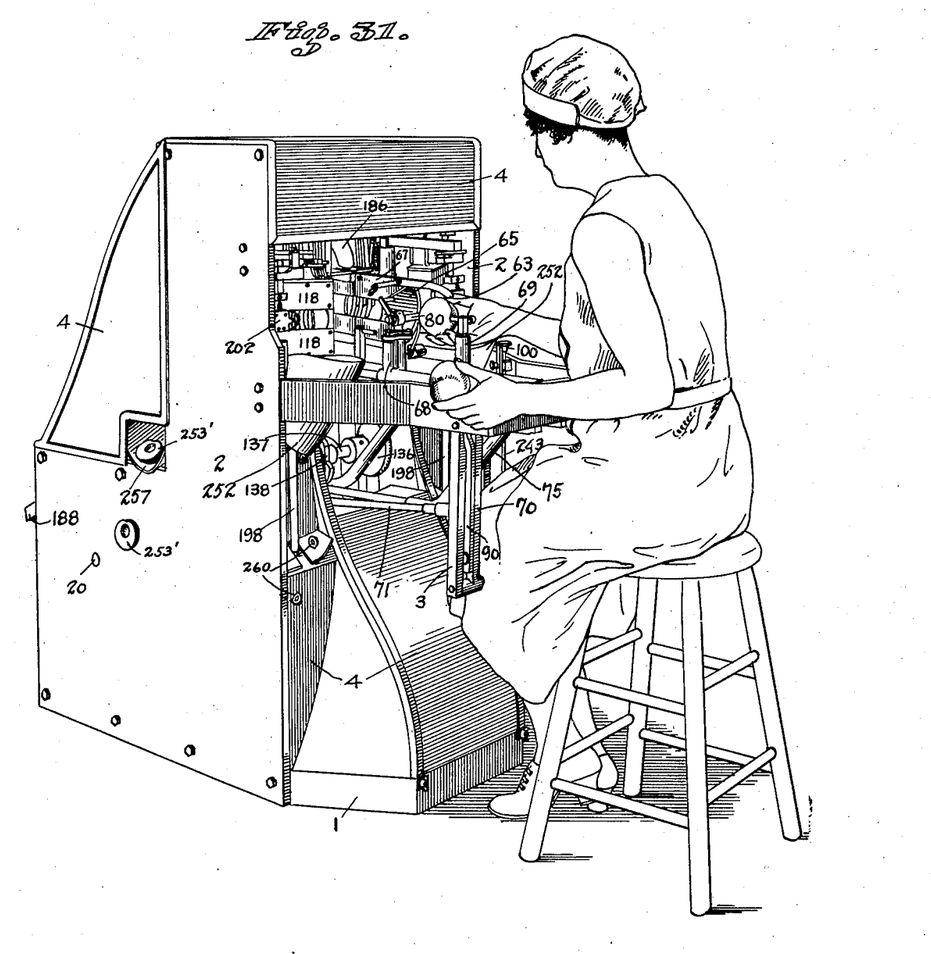
Fig. 31 is a perspective view of the complete machine all enclosed with its protective casings and showing the pit and fruit discharge chutes, also an operative feeding fruit to the machine.

If for any reason an operative should find a blade to be unable to get through a half fruit, she may discharge it from the turret by hand at the pitting position by simply pressing on a small pivoted lever 250 which is freely accessible in front of the machine and which is pivoted on a block 251 so that its far end projects under the path of push rods 161 and will raise the rod of the pitting side of the turret to thereby release its fingers and drop the half fruit into the pit chute 257 (see Fig. 31).

Operating details

The fruit when inserted between the bloom and stem end devices 61 and 62 as dotted at 253 in Fig. 6 lies in the path of a light spring arm 254 of a counting tally 255 mounted on carrier 65 so that in each advance of the carrier to impale the fruit the tally is tripped.

Figure 2:
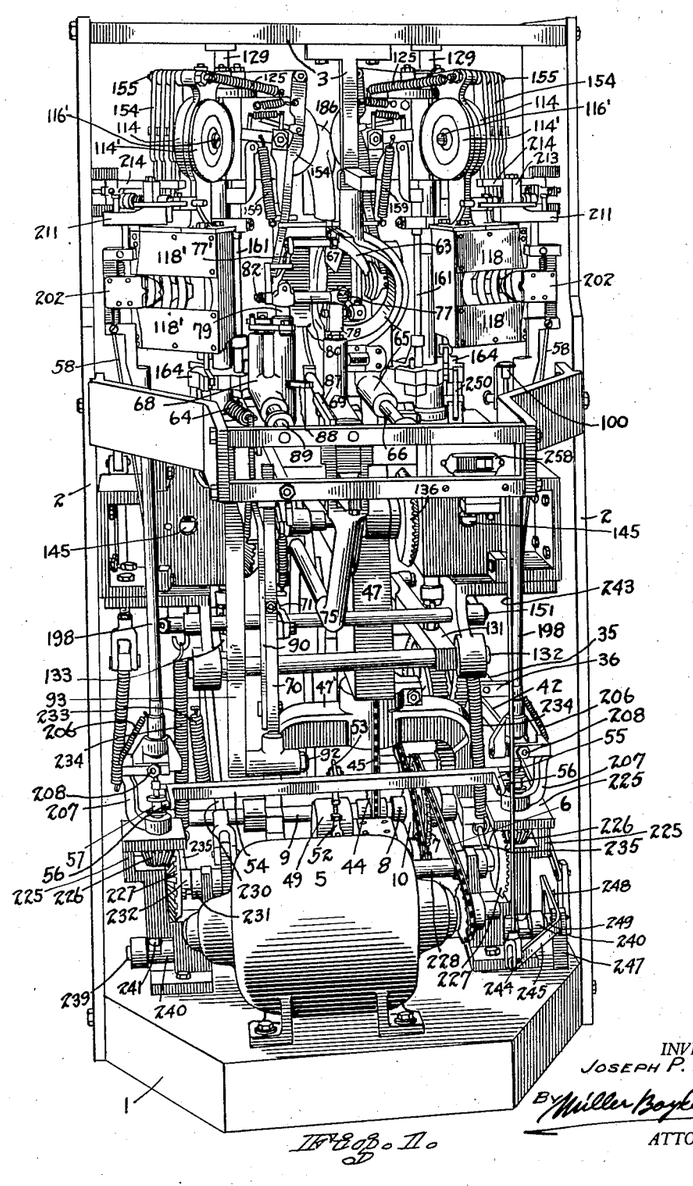
Fig. 2 is a perspective view of the machine as seen from the rear, and with protective casings omitted.
Figure 2:
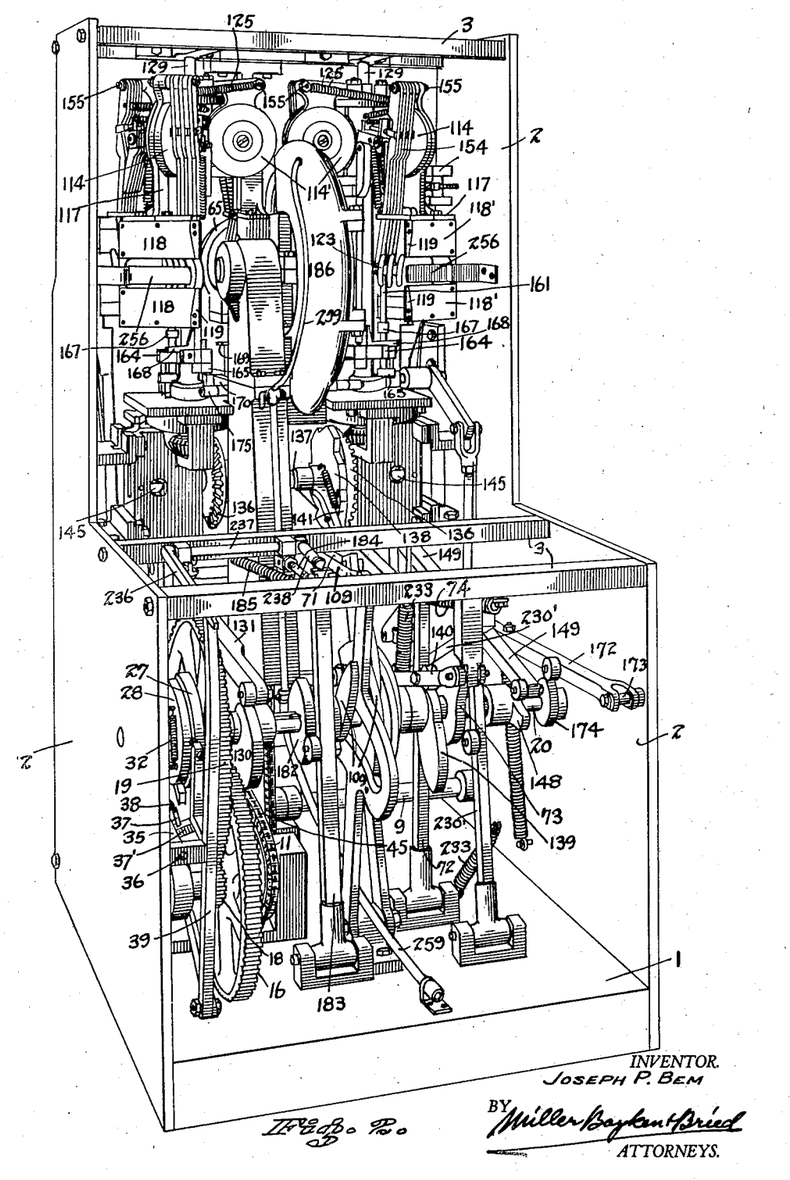

With respect to Figs. 2 and 5, after the halves have been pitted at position B, the next third revolution of the turrets carry them to position C under flat springs 256 where the clamping fingers are automatically released by the mechanism already described and the pitted or cored fruit halves 253' drop through the open lower ends of the turrets into discharge chutes 257, one of which is indicated in Fig. 31 and the pits 260 from chutes 252. Springs 256 are attached at one end to side walls 2 of the machine and serve to overcome any tendency of the fruit to stick to turret guide plates 118 after the clamping fingers have been released.

In Fig. 31 the almost completely encased machine is shown with the operative in feeding position with right hand inserting a peach and with left hand bringing another peach (as from a box or other source of supply). Thus while the left hand reaches for a new peach, the right hand presses the clutch button and both hands are therefore out of the way of danger.

For convenience the motor circuit switch is mounted at the front of the machine at 258, though in large installations I may dispense with the motors and run a battery of machines by belting from overhead line shafting in the well understood manner common to installations of automatic machines generally and therefore not illustrated.

In considering the above disclosure it will be evident that while it is primarily designed to bisect and pit clingstone peaches, it will work equally well on plums and other drupes, and by reason of the cam 222 it will core pears or any other fruit, and will cut out any shape, length or depth of core.

By the adoption of three-sided turrets the operative from her position in front of the machine can now have an unobstructed view of the blades from the point of entry to the point of emergence from the fruit.

With the present machine the turret sides are resiliently held outward by springs 125 and I have found it possible to split the peaches and stones in half by means of a cam shaft operated pair of simple chopping or shearing blades which open and close vertically in a narrower space between the confronting turrets than is required for the saw, and I am covering this feature in a copending application under Serial No. 492,773.

From the above description, the operation of the machine should be perfectly clear to anyone skilled in the art without the necessity of recapitulation to unnecessarily lengthen the specification.

I therefore claim:—

1. In a machine for operating on fruit, a turret for supporting the fruit provided each with a plurality of vertically disposed flat fruit-receiving sides, means for clamping a half fruit against the inner face of each of said sides within the figure inscribed by said sides, means revolvably supporting said turret from above only, and the bottom of said turret being open so as to permit the fruit to be dropped therethrough.

2. In a machine for operating on fruit, a turret for supporting the fruit during operation thereon provided with flat fruit-receiving sides, means for clamping a half fruit against the inner face of each of said sides within the figure inscribed by said sides, means whereby said turret is revolvably suspended from above only, and means for revolving said turret.

3. In a machine for operating on fruit, a turret for supporting the fruit during operation thereon provided with fruit-receiving sides, means whereby said turret is revolvably suspended from above, and means for revolving said turret, the sides of said turret pivotally mounted to collapse inwardly, and means for resiliently holding them out to working position.

4. In a machine for operating on fruit, a turret for supporting the fruit during operation thereon provided with fruit-receiving sides, means whereby said turret is revolvably suspended from above, means for revolving said turret, the sides of said turret pivotally suspended to collapse inwardly, means for resiliently holding them out to working position, and a plurality of clamping fingers for clamping fruit against said sides suspended from above, and means for operating said turrets and fingers in timed relation.

5. In a machine for operating on fruit, means for receiving fruit from an operative in a position facing the machine, means for bisecting the fruit, means for turning and holding the bisected fruit halves with their bisected faces extending in vertical planes slanting outwardly away from the operative with the portions to be pitted both visible to said operative in said position, and means for pitting the two halves of bisected fruit while held in such planes.

6. In a machine for operating on fruit, a fruit supporting turret and mounting comprising a vertical shaft, a hollow sleeve surrounding said shaft, a bracket on the upper portion of said sleeve, turret side members pivotally suspended from said bracket to swing from an outer working position to an inward collapsed position, and means resiliently holding said sides in outer position yet permitting them to be forcibly collapsed.

7. In a machine for operating on fruit, a fruit supporting turret and mounting comprising a vertical shaft, a hollow sleeve surrounding said shaft, a bracket on the upper portion of said sleeve, turret side members pivotally suspended from said bracket to swing from an outer working position to an inward collapsed position, means resiliently holding said sides in outer position yet permitting them to be forcibly collapsed, means for revolving the turret, and means for collapsing its sides at a point in the revolution of the turret.

8. In a machine for operating on fruit, a fruit supporting turret and mounting comprising a vertical shaft, a hollow sleeve surrounding said shaft, a bracket on the upper portion of said sleeve, turret side members pivotally suspended from said bracket to swing from an outer working position to an inward collapsed position, means resiliently holding said sides in outer position yet permitting them to be forcibly collapsed, means for revolving the turret, means for collapsing its sides at a point in the revolution of the turret comprising a member carried by said shaft engaging an extension from each side member for swinging the sides upon sliding of said shaft, and means for sliding said shaft.

9. In a machine for operating on fruit, the combination of a pair of vertically revolvable turrets with fruit-receiving sides adapted to be brought consecutively into confronting though spaced relation, and a swing circular saw mounted to pass between said confronting sides as they come around.

10. In a machine for operating on fruit, the combination of a pair of vertically revolvable turrets with fruit-receiving sides adapted to be brought consecutively into confronting though spaced relation, and a swing circular saw mounted to pass between said confronting sides as they come around, said saw being of relatively large diameter whereby it will cover the fruit area when swung to bring its axis substantially toward the center of the fruit-receiving area of said sides.

11. In a structure as specified in claim 9, the mounting of said circular saw comprising a column pivotally supported at its lower end and rotatably supporting the saw near its upper end, and a U-shaped hood covering the saw with the open side of the U directed to straddle a fruit held on said turrets.

12. In a structure as specified in claim 9, the mounting of said circular saw comprising a column pivotally supported at its lower end and rotatably supporting the saw near its upper end, a U-shaped hood covering the saw with the open side of the U directed to straddle a fruit held on said turrets, and a pair of thin spacer plates adjacent both sides of the saw above and below the fruit cutting area carried by said hood.

13. In a structure as specified in claim 9, the mounting of said circular saw comprising a column pivotally supported at its lower end and rotatably supporting the saw near its upper end, a U-shaped hood covering the saw with the open side of the U directed to straddle a fruit held on said turrets, means directing a stream of water into said hood, and means draining the water and saw refuse therefrom.

14. In a machine for operating on fruit, a pair of closely spaced flat plates on the edges of which a fruit is adapted to be impaled, a circular saw rotatable and movable bodily in the space between the plates for bisecting the fruit, a hood covering said saw and provided with an opening exposing the saw over the area of the fruit to be cut.

15. In a machine for operating on fruit, a plate against which a half fruit is positioned for pitting, and three curved fingers pivotally mounted to bear against the curved outer side of the fruit, said fingers so spaced that at least two will bear against a small fruit and all three against a larger fruit.

16. In a machine for operating on fruit, a plate against which a half fruit is positioned for pitting, three curved fingers pivotally mounted to bear against the curved outer side of the fruit, said fingers so spaced that at least two will bear against a small fruit and all three against a larger fruit, and means for independently and resiliently forcing said fingers against the fruit and locking same against reverse movement only.

17. In a machine for operating on fruit, a revolvable turret provided with a plurality of fruit-receiving sides, a plurality of curved fingers pivotally mounted to move against fruit on said sides, means for intermittently revolving the turret, means for feeding fruit to its sides at a point in the revolution of the turret, means for automatically clamping said fingers against the fruit, and a means for automatically releasing said fingers for discharge of the fruit at another point in the revolution of the turret, and manually operated means for releasing said fingers at an intermediate point.

18. In a machine for operating on fruit, a pitting blade taking the form of a complete arch, said blade sharpened on one edge and formed with a hook-like or leading point at the apex of the arch on said edge, and the rear edge of the blade curved inwardly toward said point.

19. In a machine for operating on fruit, an arched blade pivotally mounted to swing through a half fruit for cutting out the pit, the mounting including a carriage, means pivotally supporting the blade on the carriage for oscillatory movement in an arcuate direction, a shaft, means pivotally supporting the carriage for movement in the plane of the arch and a combined compression and tension spring stabilizing said carriage in intermediate position.

20. In a machine for operating on fruit, an arched blade pivotally mounted to swing through a half fruit for cutting out the pit, the mounting including a carriage, means pivotally supporting the blade on the carriage for oscillatory movement in an arcuate direction, a swivelly mounted rock shaft, means pivotally supporting the carriage on said rock shaft, resilient means for rocking said shaft to swing the blade through the fruit, and a spring connected to the shaft for pulling same in a direction to make the blade hug the pit of the fruit.

21. In a machine for operating on fruit, means for supporting a bisected half fruit for pitting, an arched blade pivotally mounted to swing through the fruit, the mounting of said blade including means whereby the blade is caused to move outwardly to hug the pit in swinging through the fruit, means whereby the blade may move bodily substantially parallel to the plane of bisection of the fruit, and means for resiliently controlling the last mentioned movement.

22. In a machine for operating on fruit, means for supporting a bisected half fruit for pitting, an arched blade pivotally mounted to swing through the fruit, the mounting of said blade including means whereby the blade is caused to move outwardly to hug the pit in swinging through the fruit, means whereby the blade may move bodily substantially parallel to the plane of bisection of the fruit, means for resiliently controlling the last mentioned movement, and means for adjusting the angle of said movement with relation to the side of the fruit.

23. In a machine for operating on fruit, an arched blade for pitting the fruit, means pivotally mounting said blade for arcuate oscillation, means for oscillating said blade including a pivoted rocker arm on which said blade is mounted, a wire secured at one end to said rocker, and means for imparting rapid reciprocatory motion to the wire including a crank at the other end of the wire, a flanged spool to which said wire is secured and said crank operating against the flange of said spool whereby the wire is free to rotate.

24. In a machine for operating on fruit, an arched blade for pitting the fruit, means pivotally mounting said blade for arcuate oscillation, means for oscillating said blade including a reciprocatory wire, crank means for reciprocating the wire, an oil housing enclosing said crank means, and a rocking lever extending out of the housing operated by said crank means, and connections from said lever to said wire.

25. In a machine for operating on fruit, a pair of spaced impaling plates, means supporting a fruit from its bloom and stem ends aligned with respect to said plates and for forcing the thus held fruit onto said plates.

26. In a machine for operating on fruit, a pair of edgewise spaced fruit impaling plates, means movable relatively to said plates for forcing a fruit into impalement therewith, a finger in the path of the fruit adapted to be moved by impingement therewith, and a counter actuated each time said finger is moved by a fruit.

27. In a machine for operating on fruit, a plurality of operable mechanisms, a cam shaft, cams on said shaft adapted for operating said mechanisms upon revolution of the shaft, a clutch on said shaft including confronting disks, a circular series of pockets in one of said disks, a jaw revolvably mounted in the other disk arranged upon part revolution to engage with any of said pockets, means resiliently urging said jaw into engagement with said pockets, a trip for holding said jaw against engagement projecting from said clutch, and a device controlled by the cycling of said machine moved into the path of said trip for holding the clutch disengaged at the end of each turn of said shaft.

28. In a construction as specified in claim 27, a plurality of means interfering with the freeing of said trip until a plurality of operations have been performed on said fruit.

29. In a machine for operating on fruit, a revolvable turret for supporting the fruit, said turret formed with three flat fruit-receiving sides arranged in triangular relation and means for clamping a half fruit against each of said sides within the triangle formed by said sides.

30. In a machine for operating on fruit, a revolvable turret provided with a plurality of flat sides for supporting fruit, means for clamping a half fruit against each of said sides within the figure formed by said sides and means whereby said sides are resiliently held out in working position against inward pressure.

31. In a machine for operating on fruit, a pair of revolvable turrets provided each with a plurality of flat sides adapted to be brought into confronting relation for receiving a fruit for bisecting, means for clamping a half fruit against each of said sides within the outlines of the figure inscribed by said sides, and means whereby said sides when in confronting relation are resiliently held in place with freedom to yield and move apart.

32. In a machine for operating on fruit, a pair of revolvable turrets provided with a plurality of flat sides adapted to be brought into confronting relation for receiving a fruit for bisecting, means for clamping a half fruit against the inner face of each of said sides within the figure inscribed by said sides, means whereby said sides when in confronting relation are resiliently held in place with freedom to yield and move apart, and means whereby said turrets are suspended from above only.

33. In a machine for operating on fruit, a pair of laterally spaced revolvable turrets each provided with three flat faces for supporting fruit, means for clamping a half fruit against the inner face of each of said sides within the figure inscribed by said sides, the faces of each turret being triangularly arranged and to come successively in confronting relation to receive the fruit, and means for pitting fruit while held on the two faces which are advanced beyond the confronting position in the direction of revolution of the turrets.

34. In a machine for operating on fruit, a pitting blade arranged to swing on an arc for cutting out a fruit core, said blade comprising a strip of metal bent to the form of a complete arch and sharpened along one edge by beveling the blade from both inside and outside to the arc of travel of the blade, and beveling the opposite or rear edge of the blade from the outer side inwardly within said arc of travel.

JOSEPH P. BEM.